(12) United States Patent
Shooshtari

(10) Patent No.: US 7,608,670 B2
(45) Date of Patent: Oct. 27, 2009

(54) BINDER COMPRISING A CROSSLINKED POLYANHYDRIDE GRAFTED WITH A LOWER MOLECULAR WEIGHT ANHYDRIDE

(75) Inventor: Kiarash Alavi Shooshtari, Littleton, CO (US)

(73) Assignee: Johns Manville, Denver, CO (US)

( * ) Notice: Subject to any disclaimer, the term of this patent is extended or adjusted under 35 U.S.C. 154(b) by 262 days.

(21) Appl. No.: 11/602,579

(22) Filed: Nov. 20, 2006

(65) Prior Publication Data

US 2008/0119609 A1    May 22, 2008

(51) Int. Cl.
*C08F 20/00* (2006.01)
*B05D 3/02* (2006.01)

(52) U.S. Cl. ............. 525/329.5; 525/69; 525/165; 525/172; 525/383; 525/384; 525/419; 525/386; 525/437; 427/372.2; 427/389.8

(58) Field of Classification Search ............. 525/69, 525/165, 172, 329.5, 383, 384, 386, 419, 525/437
See application file for complete search history.

(56) References Cited

U.S. PATENT DOCUMENTS

| | | | |
|---|---|---|---|
| 5,143,582 A | 9/1992 | Arkens et al. | |
| 5,318,990 A | 6/1994 | Strauss | |
| 5,340,868 A | 8/1994 | Strauss et al. | |
| 5,427,587 A | 6/1995 | Arkens et al. | |
| 5,661,213 A | 8/1997 | Arkens et al. | |
| 5,698,641 A * | 12/1997 | Gould et al. | 525/438 |
| 5,763,524 A * | 6/1998 | Arkens et al. | 524/547 |
| 6,136,916 A | 10/2000 | Arkens et al. | |
| 6,221,973 B1 | 4/2001 | Arkens et al. | |
| 6,331,350 B1 | 12/2001 | Taylor et al. | |
| 6,699,945 B1 * | 3/2004 | Chen et al. | 525/445 |
| 6,706,853 B1 | 3/2004 | Stanssens et al. | |
| 7,157,524 B2 * | 1/2007 | Chen et al. | 525/329.5 |
| 2006/0216489 A1 | 9/2006 | Shooshtari et al. | |
| 2006/0217471 A1 | 9/2006 | Shooshtari et al. | |

FOREIGN PATENT DOCUMENTS

EP    0 583 086 B1    11/1997

OTHER PUBLICATIONS

Arkens, Charles T., et al., "Formaldehyde—Free Crosslinking Binders For Non-Wovens", Tappi Journal 78 (11):161-168(1995).

* cited by examiner

*Primary Examiner*—Vasu Jagannathan
*Assistant Examiner*—Robert C Boyle
(74) *Attorney, Agent, or Firm*—Robert D. Touslee

(57) ABSTRACT

An improved curable formaldehyde-free binding composition is provided. Such curable composition comprises the reaction product of a polyanhydride and a polyol crosslinker and a lower molecular weight anhydride. Initially, the polyanhydride is modified through reaction with a polyol (e.g., a glycol or an alkanolamine) and subsequently is grafted with the lower molecular weight anhydride (e.g., maleic anhydride) to form a water-soluble or water-dispersible curable reaction product. The composition is well suited for binding fibrous materials (e.g., a mat of glass fibers) or for bonding together non-fibrous materials. The binder composition displays an advantageous viscosity so as to facilitate a flowable application with ease combined with an adequately high molecular weight to satisfactorily undergo service as a binder following curing even when harsh environmental conditions (e.g., hot humid air) are encountered for a prolonged period of time

22 Claims, No Drawings

BINDER COMPRISING A CROSSLINKED POLYANHYDRIDE GRAFTED WITH A LOWER MOLECULAR WEIGHT ANHYDRIDE

FIELD OF THE INVENTION

The subject invention pertains to an improved binder composition for fibrous materials or for joining non-fibrous materials. More specifically, the invention pertains to an improved curable composition comprising a reaction product of a polyanhydride and a polyol crosslinker which is grafted with a lower molecular weight anhydride.

DESCRIPTION OF THE RELATED ART

Fiberglass binders have a variety of uses ranging from stiffening applications where the binder is applied to woven or non-woven fiberglass sheet goods and is cured, producing a stiffer product; thermo-forming applications wherein the binder resin is applied to a sheet or lofty fibrous product, following which it is dried and optionally B-staged to form an intermediate but yet curable product; and to fully cured systems such as building insulation.

Fibrous glass insulation products generally comprise maited glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder has been used throughout the fibrous glass insulation industry. The residual heat from the glass fibers and the flow of air through the fibrous mat during the forming operation are generally sufficient to volatilize water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet possess characteristics so as to form a rigid thermoset polymeric mat for the glass fibers when cured. A low binder viscosity in the uncured state is required to allow the mat to be sized correctly. Also, viscous binders commonly tend to be tacky or sticky and hence they lead to the accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its as-made vertical dimension when installed in a building.

From among the many thermosetting polymers, numerous candidates for suitable thermosetting fiberglass binder resins exist. However, binder-coated fiberglass products are often of the commodity type, and thus cost becomes a driving factor, generally ruling out resins such as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass insulation industry for years, for example.

Over the past several decades however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent Federal regulations, more and more attention has been paid to alternative binder systems which are free from formaldehyde.

One such candidate binder system employs polymers of acrylic acid as a first component, and a polyol such as glycerine or a modestly oxyalkylated glycerine as a curing or "crosslinking" component. The preparation and properties of such poly(acrylic acid)-based binders, including information relative to the VOC emissions, and a comparison of binder properties versus urea-formaldehyde binders is presented in "Formaldehyde-Free Crosslinking Binders For Non-Wovens", Charles T. Arkins et al., TAPPI JOURNAL, Vol. 78, No. 11, pages 161-168, November 1995. The binders disclosed by the Arkins article, appear to be B-stageable as well as being able to provide physical properties similar to those of urea/formaldehyde resins.

U.S. Pat. No. 5,340,868 discloses fiberglass insulation products cured with a combination of a polycarboxy polymer, α-hydroxyalkylamide, and at least one trifunctional monomeric carboxylic acid, such as citric acid. The specific polycarboxy polymers disclosed are poly(acrylic acid) polymers. See also, U.S. Pat. No. 5,143,582.

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

U.S. Pat. No. 6,706,853 discloses a binder for mineral fibers wherein a cyclic anhydride and an alkanolamine are reacted to form a component of a binder composition.

Commonly assigned U.S. patent application Ser. No. 11/086,166, filed Mar. 22, 2005, discloses a binder composition comprising maleinized polyenes, and in commonly assigned U.S. patent application Ser. No. 11/086,196, filed Mar. 22, 2005, discloses a binder composition comprising maleinated polyols.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly (acrylic acids) are stated to provide polymers exhibiting more complete cure. See also U.S. Pat. Nos. 5,661,213; 5,427,587; 6,136,916; and 6,221,973.

Some polycarboxy polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb liquid water, thereby possibly compromising the integrity of the product. Also, the thermosetting acrylic resins now being used as binding agents for fiberglass have been found to not react as effectively with silane coupling agents of the type traditionally used by the industry. The addition of silicone as a hydrophobic agent results in problems when abatement devices are used that are based on incineration. Also, the presence of silicone in the manufacturing process can interfere with the adhesion of certain facing substrates to the finished fiberglass material. Overcoming these problems will help to better utilize polycarboxy polymers in fiberglass binders.

Accordingly, it is an object of the present invention to provide a novel, non-phenol-formaldehyde binder.

It is an object of the present invention to provide a curable binder which displays a sufficiently low viscosity to be applied with ease combined with a sufficiently high molecular weight to provide superior service characteristics following curing.

It is an object of the present invention to provide an improved binder composition which following curing can well withstand environmental conditions, such as hot humid air.

It is a further object of the invention to provide a process for forming the improved binder of the present invention.

These and other objects of the present invention will become apparent to the skilled artisan upon a review of the following description and the claims appended hereto.

SUMMARY OF THE INVENTION

A process for preparing an improved binder is provided comprising:

(a) crosslinking a polyanhydride by reaction with a polyol to form an intermediate reaction product, and (b) thereafter introducing to a reaction zone containing said intermediate reaction product an anhydride having a molecular weight less than 1,000 to achieve the reaction of the anhydride with the intermediate reaction product to from a grafted water-soluble or water-dispersible curable reaction product having a viscosity suitable for application as a component of a binding composition and a molecular weight that is well suited for performance as a binder following subsequent curing.

A binder composition additionally is provided which comprises the grafted water-soluble or water-dispersible curable reaction product formed by the process of the present invention.

DETAILED DESCRIPTION OF PREFERRED EMBODIMENTS

The curable binder composition of the present advantageously is formaldehyde-free and possesses a viscosity that can be applied with ease combined with a sufficiently high molecular weight and chemical stability to well serve as a reliable binder following curing.

Initially a polyanhydride is caused to undergo a crosslinking reaction with a polyol crosslinker.

Such polyanhydride displays a plurality of anhydride functional groups and is of a relatively high molecular of greater than 1,000 μp to approximately 1,000,000. In a preferred embodiment the molecular weight of the polyanhydride is greater than 1,000 μp to approximately 50,000, and in a particularly preferred embodiment greater than 1,000 μp to approximately 5,000.

Representative polyanhydrides suitable for use when carrying out the present invention include polyacrylic anhydride, polymethacrylic anhydride, poly(acrylic-co-methacrylic) anhydride, poly(acrylic-co-maleic) anhydride, poly(methacrylic-co-maleic) anhydride, polycrotonic anhydride, polymaleic anhydride, poly(styrene-maleic) anhydride, poly(ethylene-maleic) anhydride, poly(propylene-maleic) anhydride, poly(vinylether-maleic) anhydride, and mixtures of the foregoing. The polyanhydride optionally can possess a block structure. When the polyanhydride includes a substantial concentration of water-insoluble blocks such as styrene or ethylene, the resulting intermediate reaction product commonly will be water-dispersible rather than water-soluble. Preferred polyanhydrides for use when practicing the present invention are polyacrylic anhydride, polymethacrylic anhydride, and poly(styrene-maleic) anhydride possessing the appropriate molecular weight.

The polyol crosslinker utilized in the initial step of the process of the present invention possesses a plurality of reactive hydroxyl groups which are capable of undergoing a crosslinking reaction with the polyanhydride.

Representative polyol crosslinkers suitable for use when carrying out the present invention include glycols, glycol ethers, alkanolamines, polyester polyols, polyether polyols, acrylic polyols, urethane polyols, polysaccharides, polyvinyl alcohol, polypeptides, and mixtures thereof. Glycols are preferred since they are found to promote the formation of near white binder following final curing, Glycols of natural origin, such as 1,3-propandiol or glycerol are well suited for use as a crosslinker. The particularly preferred crosslinker for reaction with the polyanhydride are 1,2-propanediol and 1,3-propanediol. Other preferred crosslinkers for reaction with the polyanhydride are diethanolamine and triethanolamine.

The initial crosslinking reaction commonly is carried out with stirring at a temperature of approximately 20 to 100° C. When a glycol is used as a crosslinker, the polyanhydride advantageously can be dissolved in an organic solvent such as acetonitrile, acetone, methylethyl ketone, dimethyl formamide (DMF), tetrahydrofuran (THF), dioxane, etc., when the initial crosslinking reaction is carried out. When the crosslinker is a alkanolamine, such as diethanol amine or triethanol amine the crosslinking advantageously can be carried out in water.

The resulting crosslinked intermediate reaction product formed by the reaction of the polyanhydride and polyol commonly possesses hydroxyl end groups. Fourier Transform Infrared Spectroscopy (FTIR) can be utilized to characterize such end groups.

Next, an anhydride having a molecular weight less than 1,000 is introduced in a reaction zone containing the crosslinked intermediate reaction product to form a grafted water-soluble or grafted water-dispersible curable reaction product having a viscosity suitable for application as a component of a binding composition and a molecular weight well suited for performance as a binder following subsequent curing.

Representative anhydrides for use when carrying out the grafting reaction include maleic anhydride, trimellitc anhydride, pyromellitic dianhydride, 3,3',4,4'-benzophenone tetracarboxylic dianhydride, phthalic anhydride, tetrahydrophthalic anhydride, succinic anhydride, glutaric anhydride, alkyl succinic anhydrides, and mixtures of the foregoing. The preferred anhydride having a molecular less than 1,000 for use when carrying out the grafting reaction is maleic anhydride having a molecular weight of 98. Other preferred low molecular weight anhydrides for use when carrying out the grafting reaction include tetrahydro phthalic anhydride having a molecular weight of 152, and trimellitic anhydride having molecular weight of 192.

The grafting reaction commonly is carried out at a temperature of approximately 20 to 100° C., and preferably at a temperature of approximately 60 to 95° C. Once formed, the curable reaction product can be readily isolated through the use of vacuum distillation, or other appropriate means.

The grafted curable reaction product commonly displays carboxylic acid end groups which are amenable to undergo curing to form a highly stable molecular structure following the application of the binder as described hereafter. Fourier Transform Infrared Spectroscopy (FTIR) can be utilized to characterize the end groups. The nature of the grafting commonly is of the comb type with many grafted molecular side branches derived from the lower molecular weight anhydride being present on a relatively linear molecule of the intermediate reaction product.

In accordance with the concept of the present invention the grafting of the previously formed crosslinked intermediate reaction product has a beneficial influence upon its properties which has been found to translate into improved service as a binder. More specifically, the grafted curable reaction product displays a reduced viscosity when compared to the non-grafted intermediate reaction product at the same molecular weight and solids concentration. Such reduced viscosity facilitates ease of handling and the flowable application of the binder composition to achieve better penetration and coverage when the binder is used with a fibrous material. Also, the molecular weight is further raised and enhanced which leads to improved service characteristics once the binder is applied and subsequently is cured. For instance, the higher molecular weight binder component is more physically and chemically stable and can better withstand harsh environment conditions during use, such as prolonged exposure to hot humid air. Also, a fibrous material bound by the cured improved binder of the present invention is more rigid, and displays an enhanced tensile strength, and better retention of tensile strength. Other advantages include better coverage of the fiber glass to prevent fracture of fibers and to protect the fibers against corrosive media.

Such curable reaction product commonly displays a viscosity of approximately 50 to 3,000 cps when provided in 50 weight percent concentrations in water and a molecular weight of at least 2,000. In a preferred embodiment the curable reaction product displays a viscosity of approximately 50 to 1,500 cps when provided in a 50 weight percent concentration in water and a molecular weight of approximately 2,000 to 10,000. In a particularly preferred embodiment the curable reaction product displays a viscosity of approximately 300 to 700 cps when provided in a 50 weight percent concentration in water and a molecular weight of approximately 4,000 to 8,000.

The grated curable reaction product is provided in an appropriate liquid medium together with a crosslinking agent to form the binder composition of the present invention. The binder composition of the present invention can be applied as an emulsion, suspension, or solution of the grafted curable reaction product. In a preferred embodiment the grafted curable reaction product is water-soluble and can be simply applied while dissolved in an appropriate concentration in water. In a preferred embodiment the curable reaction product is dissolved or dispersed in water in a concentration of approximately 7.5 to 12.5 percent by weight (e.g., approximately 10 percent by weight). Preferred crosslinkers are diethanolamine or triethanolamine. Any crosslinker capable of reaction with the end groups of the grafted curable reaction product can be utilized, such as glycols. The binder composition optionally can include adhesion promoters, oxygen scavengers, solvents, emulsifiers, pigments, fillers, anti-migration aids, coalescents, welting agents, biocides, plasticizers, organosilanes, anti-foaming agents, colorants, waxes, suspending agents, anti-oxidants, crosslinking catalysts, secondary crosslinkers, and combinations of these. The medium containing the grafted curable binder commonly displays a viscosity of approximately 1 to 100 cps, and preferably a viscosity of approximately 1 to 5 cps.

When a fibrous material is to receive the binder, a coating application can be achieved in accordance with known techniques for coating a fibrous web. In preferred embodiments, these include spraying, spin-curtain coating, dipping-roll coating, etc. The composition can be applied to a mat of glass fibers or freshly-formed fiberglass, or to fiberglass following collection.

Fiberglass can be provided in a variety of configurations when bound by the binding composition of the present invention, and preferably is in the form of a non-woven. In preferred embodiments, the non-woven fiberglass is in the form of a fibrous mat or more particularly as building insulation. In other embodiments, the fiberglass is a microglass-based substrate useful when forming a printed circuit board, battery separator, filter stock, or reinforcement scrim.

Once applied to the fiberglass, the coated reaction product is heated for a time sufficient to achieve curing to form a water-insoluble cured binder which exhibits good adhesion to glass. During the curing, further crosslinking takes place. Representative curing temperatures commonly are approximately 100 to 300° C., (e.g., 120 to 200° C.) for approximately 1 to 40 minutes (e.g., approximately 10 to 30 minutes). The fibrous components are well bound together at fiber cross-over points.

The cured binder at the conclusion of the curing step commonly is present as a secure coating on fiberglass in a concentration of approximately 0.5 to 50 percent by weight of the fiberglass, and most preferably in a concentration of approximately 1 to 10 (e.g., 5 to 6) percent by weight of the fiberglass.

The present invention provides a formaldehyde-free route to form a securely bound formaldehyde-free fiberglass product. The binder composition of the present invention makes possible the carrying out of the coating application with ease, the possibility to eliminate the inclusion of a silane, and improved overall economics.

Alternatively, the curable binder composition can be used to advantage to similarly securely bind together at least two adjoining non-fibrous substrates, such as those formed of glass, metal, synthetic polymeric materials, natural products (e.g., wood), or combinations of these. The binder composition simply can be provided between the adjoining substrates and cured by heating as previously described. Thereafter, the adjoining substrates are securely joined.

The following examples are presented to provide specific examples of the present invention. It should be understood, however, that the invention is not limited to the specific details set forth in the Examples.

EXAMPLE 1

In a stirred reaction vessel 12.6 grams of polyacrylic anhydride having a molecular weight of approximately 4,000 were dissolved in 70 grams of acetonitrile solvent. To this solution were added 7.6 grams of 1,3-propanediol crosslinker, and the contents of the reaction vessel while at a temperature of 82° C. were stirred for 12 hours under reflex conditions to form 20.2 grams of crosslinked water-insoluble intermediate product possessing hydroxyl end groups.

To the intermediate product dissolved in 70 grams of acetonitrile solvent 9.8 grams of maleic anhydride having a molecular weight of 98.06 were added, followed by refluxing at 82° C. for 12 hours during which time a grafting reaction took place on the previously formed intermediate product and the hydroxyl end groups of the intermediate product were replaced by carboxylic acid end groups. The grafted product was curable and was present as a clear solution in acetonitrile.

The curable reaction product was isolated by vacuum distillation and was dissolved in water. It was determined that the grafted product had a viscosity of only 650 cps when provided in a 50 weight percent concentration in water and a molecular weight of approximately 8,500. To this solution were added 5.0 grams of triethanolamine crosslinker and a 10 percent by weight solution of the curable reaction product having a viscosity of 15 cps, and was coated on glass fiber mat and was heated at 200° C. for 2 minutes to form a cured white infusible and water-insoluble binder that adhered well to the glass. The cured binder was present in a concentration of 5 percent by weight of the glass fibers and bound the fibers at cross-over points.

Such binding composition utilizing the grafted curable reaction product was considered to be superior to a binding composition formed while utilizing the crosslinked water-insoluble intermediate product at the same concentration level in view of the manifestation of a lower viscosity at the same percent solids concentration. The manifest lower viscosity facilitated improved application efficiencies with enhanced fiber penetration.

By contrast the crosslinked intermediate product displayed a molecular weight of approximately 8,000 and possessed a higher viscosity of 25 cps at a 10 percent weight concentration in water.

Also, the glass fiber mat of the present invention following curing when compared to a comparably prepared bound glass fiber mat utilizing the intermediate reaction product as a binder displayed a higher tensile strength and a better retention of tensile strength following exposure to environmental conditions, including exposure to heated humid air.

EXAMPLE 2

To a stirred reaction vessel equipped with a reflux condenser were added 700 grams of water and 105.0 grams of diethanolamine crosslinker. Once the diethanolamine was dissolved the temperature was raised to 90° C. and 126.0 grams of polyacrylic anhydride having molecular weight of approximately 4,000 were added slowly in four increments of 31.5 grams each over a period of one hour. This solution was heated with stirring for one additional hour at 90° C. to form a water-soluble intermediate product containing amide groups and possessing pendant alcohol groups.

To the crosslinked intermediate product were added 98 grams of maleic anhydride having a molecular weight of 98 were added, followed by refluxing at 95° C. for 12 hours during which time a grafting reaction took place on the previously formed intermediate product and hydroxy end groups of the intermediate product were replaced by carboxylic acid end groups. The grafted product was curable and was present as a clear aqueous solution.

It was determined that the grafted product had a viscosity of only 580 cps when provided in a 50 weight percent concentration in water and a molecular weight of approximately 9,000. To this solution were added 50 grams of triethanolamine crosslinker and a 10 percent by weight solution of the curable reaction product having a viscosity of 10 cps was coated on glass fiber mat where it was heated at 200° C. for 2 minutes to form a cured infusible and water-insoluble binder that adhered well to the glass. The cured binder was present in a concentration of 5 percent by weight of the glass fibers and bound the glass fibers at the cross-over points.

Such binding composition utilizing the grafted curable reaction product was considered to be superior to a binding composition formed while utilizing the crosslinked intermediate product at the same concentration level in view of the manifestation of a lower viscosity at the same percent solids. The manifest lower viscosity facilitated improved application efficiencies with enhanced fiber penetration.

By contrast the crosslinked intermediate product displayed a molecular weight of approximately 6,000, and possessed a higher viscosity of 35 cps at a 10 percent weight concentration in water.

Also, the glass fiber mat of the present invention following curing when compared to a comparably prepared bound glass fiber mat utilizing the intermediate reaction product as a binder displayed a higher tensile strength and a better retention of tensile strength following exposure to environmental conditions, including exposure to heated humid air.

EXAMPLE 3

To a stirred reaction vessel equipped with a reflux condenser were added 70 grams of water and 14.0 grams of diethanolamine. Once the diethanolamine was dissolved the temperature was raised to 90° C. and 23.5 grams of poly (styrene-maleic) anhydride having molecular weight of approximately 2,000 were added slowly in five increments of 4.7 grams each to achieve dissolution over a period of 5 hours. This solution was heated with stirring for one additional hour at 90° C. to form an intermediate product possessing pendant hydroxy groups.

To the intermediate product were added 4.9 grams of maleic anhydride having a molecular weight of 98 were added, followed by refluxing at 95° C. for 1 hour during which time a grafting reaction took place on the previously formed intermediate product and hydroxy end groups of the intermediate product were replaced by carboxylic acid end groups. The grafted product was curable and was present as a clear aqueous solution.

It was determined that the grafted product had a viscosity of only 400 cps when provided in a 50 weight percent concentration in water and a molecular weight of approximately 4,000. A 10 percent by weight solution of the curable reaction product having a viscosity of 5 cps was coated on glass fiber mat where it was heated at 200° C. for 2 minutes to form an infusible and water-insoluble binder that adhered well to the glass. The cured binder was present in a concentration of 6 percent by weight of the glass fibers and bound the glass fibers at cross-over points.

Such binding composition utilizing the grafted curable reaction product was considered to be superior to a binding composition formed while utilizing the crosslinked intermediate product at the same concentration level in view of the manifestation of a lower viscosity at the same percent solids.

The manifest lower viscosity facilitated improved application efficiencies with enhanced fiber penetration.

By contrast the crosslinked intermediate product displayed a molecular weight of approximately 4,000, and possessed a higher viscosity of 10 cps at a 10 percent weight concentration in water.

Also, the glass fiber mat of the present invention following curing when compared to a comparably prepared bound glass fiber mat utilizing the intermediate reaction product as a binder displayed a tensile strength and a better retention of tensile strength following exposure to environmental conditions, including exposure to heated humid air.

The principles, preferred embodiments, and modes of operation of the present invention have been described in the foregoing specification. The invention which is protected herein, however, is not to be construed as being limited to the particular forms disclosed, since these are to be regarded as being illustrative rather than restrictive. Variations and changes may be made by those skilled in the art without departing from the spirit of the invention.

I claim:

1. A process for preparing an improved binder comprising:
   (a) crosslinking a polyanhydride by reaction with a polyol crosslinker to form an intermediate reaction product, and
   (b) thereafter introducing to a reaction zone containing said intermediate reaction product an anhydride having a molecular weight less than 1,000 to achieve the reaction of said anhydride with said intermediate reaction product to form a grafted water-soluble or water-dispersible curable reaction product.

2. A process according to claim 1, wherein said polyanhydride of step (a) has a molecular weight of greater than 1,000 to approximately 1,000,000.

3. A process according to claim 1, wherein said polyanhydride of step (a) has a molecular weight of greater than 1,000 to approximately 50,000.

4. A process according to claim 1, wherein said polyanhydride of step (a) has a molecular weight of greater than 1,000 to approximately 5,000.

5. A process according to claim 1, wherein said polyanhydride of step (a) is selected from the group consisting of polyacrylic anhydride, polymethacrylic anhydride, poly(acrylic-co-methacrylic) anhydride, poly(acrylic-co-maleic) anhydride, poly(methacrylic-co-maleic) anhydride, polycrotonic anhydride, polymaleic anhydride, poly(styrene-maleic) anhydride, poly(ethylene-maleic) anhydride, poly(propylene-maleic) anhydride, poly(vinylether-maleic) anhydride, and mixtures of the foregoing.

6. A process according to claim 1, wherein said polyanhydride of step (a) is polyacrylic anhydride.

7. A process according to claim 1, wherein said polyanhydride of step (a) is poly(styrene-maleic) anhydride.

8. A process according to claim 1, wherein said polyanhydride of step (a) is polymethacrylic anhydride.

9. A process according to claim 1, wherein said polyol crosslinker of step (a) is selected from the group consisting of glycols, glycol ethers, alkanolamines, polyester polyols, polyether polyols, acrylic polyols, urethane polyols, polysaccharides, polyvinyl alcohol, polypeptides, and mixtures thereof.

10. A process according to claim 1, wherein said polyol crosslinker of step (a) is 1,2-propanediol or 1,3-propanediol.

11. A process according to claim 1, wherein said polyol of step (a) is diethanol amine.

12. A process according to claim 1, wherein said polyol of step (a) is triethanol amine.

13. A process according to claim 1, wherein said crosslinking of step (a) is carried out at a temperature of approximately 20 to 100° C.

14. A process according to claim 1, wherein said reaction of step (a) is carried out at a temperature of approximately 60 to 95° C.

15. A process according to claim 1, wherein the grafted water-soluble or water-dispersible curable reaction product of step (b) possesses pendant carboxylic acid groups.

16. A process according to claim 1, wherein said anhydride having a molecular weight of less than 1,000 of step (b) is selected from the group consisting of maleic anhydride, trimellitic anhydride, pyromellitic dianhydride, 3,3',4,4'-benzophenone tetracarboxylic dianhydride, phthalic anhydride, tetrahydrophthalic anhydride, succinic anhydride, glutaric anhydride, and mixture of the foregoing.

17. A process according to claim 1, wherein said anhydride having a molecular weight of less than 1,000 of step (b) is maleic anhydride.

18. A process according to claim 1, wherein said reaction of step (b) to form a grafted water-soluble or water-dispersible curable reaction product is carried out at a temperature of approximately 20 to 100° C.

19. A process according to claim 1, wherein said reaction of step (b) to form a grafted water-soluble or water-dispersible curable reaction product is carried out at a temperature of approximately 60 to 95° C.

20. A process according to claim 1, wherein said curable reaction product of step (b) prior to subsequent curing possesses a viscosity of approximately 50 to 3,000 cps when provided in a 50 weight percent concentration in water, and a molecular weight of at least 2,000.

21. A process according to claim 1, wherein said curable reaction product of step (b) prior to subsequent curing possesses a viscosity of approximately 50 to 1,500 cps when provided in a 50 weight percent concentration in water, and a molecular weight of approximately 2,000 to 10,000.

22. A binder composition comprising the grafted water-soluble or water-dispersible curable reaction product formed by the process of claim 1.

* * * * *